United States Patent [19]
Raymond et al.

[11] Patent Number: 5,868,429
[45] Date of Patent: *Feb. 9, 1999

[54] MULTIDIRECTIONAL MULTIPLE FOLD LAMINATED PRODUCT AND METHOD OF MAKING

[75] Inventors: David P. Raymond, Lake Villa; Paul R. Stensvaag, Palatine; Kenneth R. Bogner, Mt. Prospect, all of Ill.

[73] Assignee: Rand McNally & Company, Skokie, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 855,313

[22] Filed: May 13, 1997

Related U.S. Application Data

[63] Continuation of Ser. No. 383,057, Feb. 3, 1995, abandoned.

[51] Int. Cl.⁶ .................................................. G09B 29/00
[52] U.S. Cl. ............................. 283/34; 410/904; 434/150
[58] Field of Search .......................... 283/34, 35; 281/29, 281/38; 402/79; 40/904; 434/130, 150, 153; 428/35.2

[56] References Cited

U.S. PATENT DOCUMENTS

| | | | |
|---|---|---|---|
| D. 262,040 | 11/1981 | Wihlke | D19/33 |
| D. 312,095 | 11/1990 | Mandel | D19/26 |
| 1,159,459 | 11/1915 | Wood | 281/15.1 |
| 1,697,350 | 1/1929 | Eubank | 283/34 |
| 1,853,829 | 4/1932 | Maury | 283/34 |
| 2,190,438 | 2/1940 | Vogt | 283/34 |
| 3,718,348 | 2/1973 | Bellanca | 281/46 |
| 4,540,612 | 9/1985 | Rhyner | 428/35 |
| 4,906,024 | 3/1990 | Lein | 283/34 X |
| 5,063,637 | 11/1991 | Howard et al. | 16/225 |
| 5,087,145 | 2/1992 | Cooley | 402/79 |
| 5,207,457 | 5/1993 | Haynes | 283/34 |
| 5,273,432 | 12/1993 | White | 283/34 X |
| 5,472,239 | 12/1995 | Trujilo | 283/34 |

FOREIGN PATENT DOCUMENTS

| | | | |
|---|---|---|---|
| 866337 | 4/1941 | France | 283/34 |
| 2553342 | 10/1984 | France | 402/79 |
| 20385 | of 1915 | United Kingdom | 283/34 |
| 915581 | 1/1963 | United Kingdom | 283/34 |

*Primary Examiner*—Frances Han
*Attorney, Agent, or Firm*—Laff, Whitesel, Conte & Saret, Ltd.

[57] ABSTRACT

A laminated map or other product having a plurality of adjacent rectangular panels, formed of a paperboard sheet and a pair of transparent sheets covering the paperboard sheet, with the transparent sheets joining all of the paperboard sheets into an integrated product. The panels are arranged in at least two rows of plural panels and a plurality of columns of panels. When the pairs of panels in the columns are accordion-folded in the direction of the columns, and are then folded to cause the panels of one row to overlie the panels of the other row, the product will fold into a compact stack without substantial resistance to movement into that configuration and will be substantially flat, and when the panels are temporarily folded into single stack compact random arrays, those arrays will be compact and substantially flat. A method of making a multidirectional, multiple fold laminated product is also described.

8 Claims, 5 Drawing Sheets

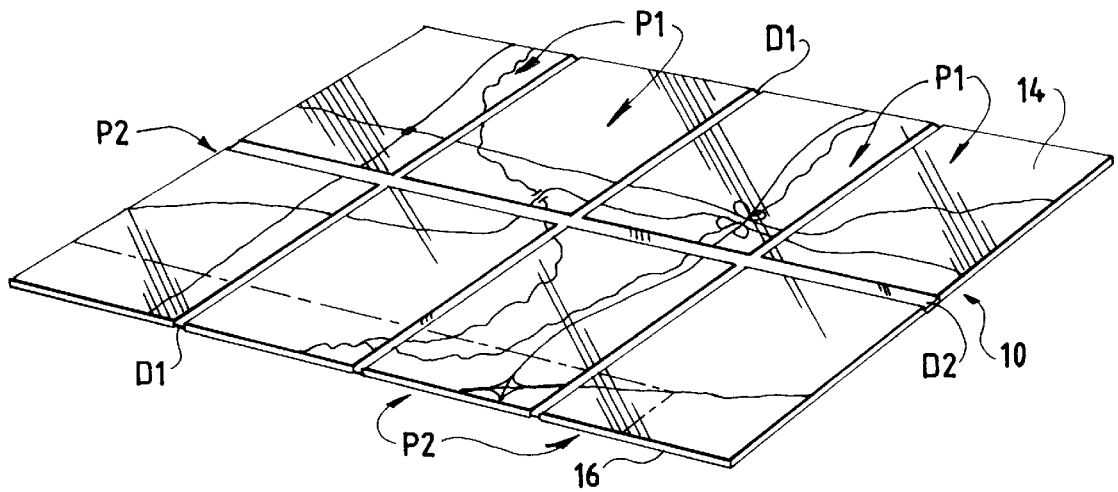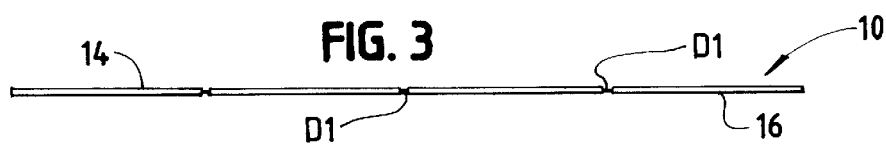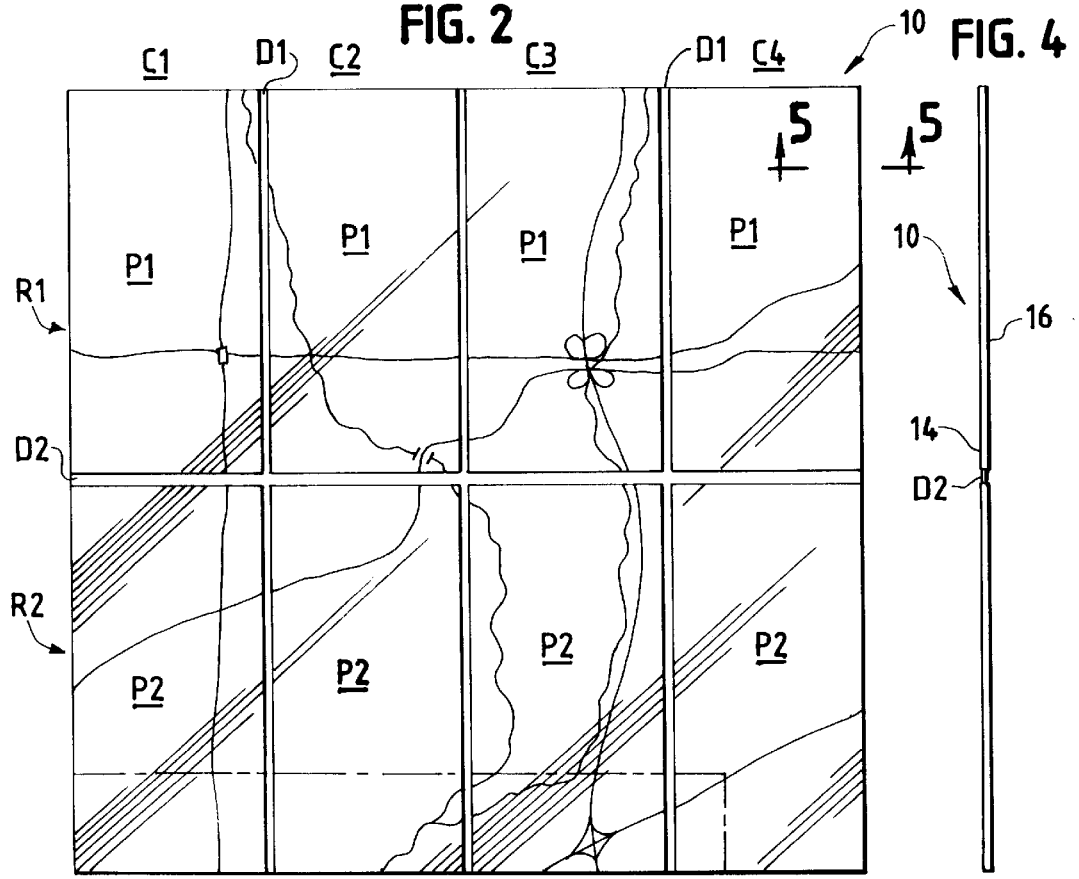

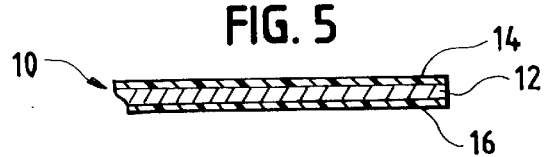
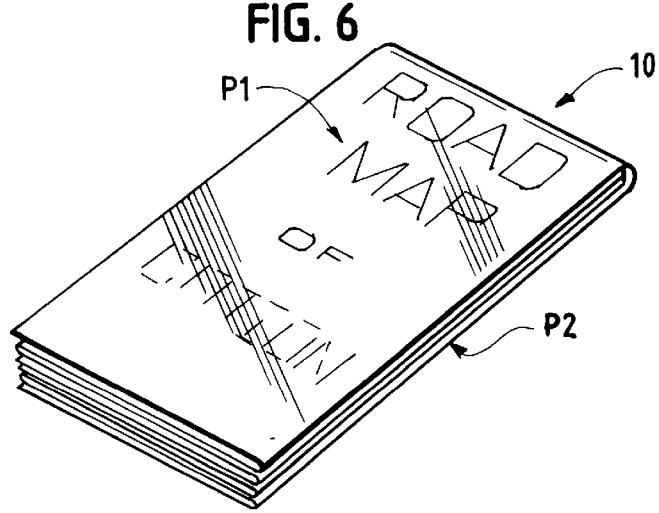
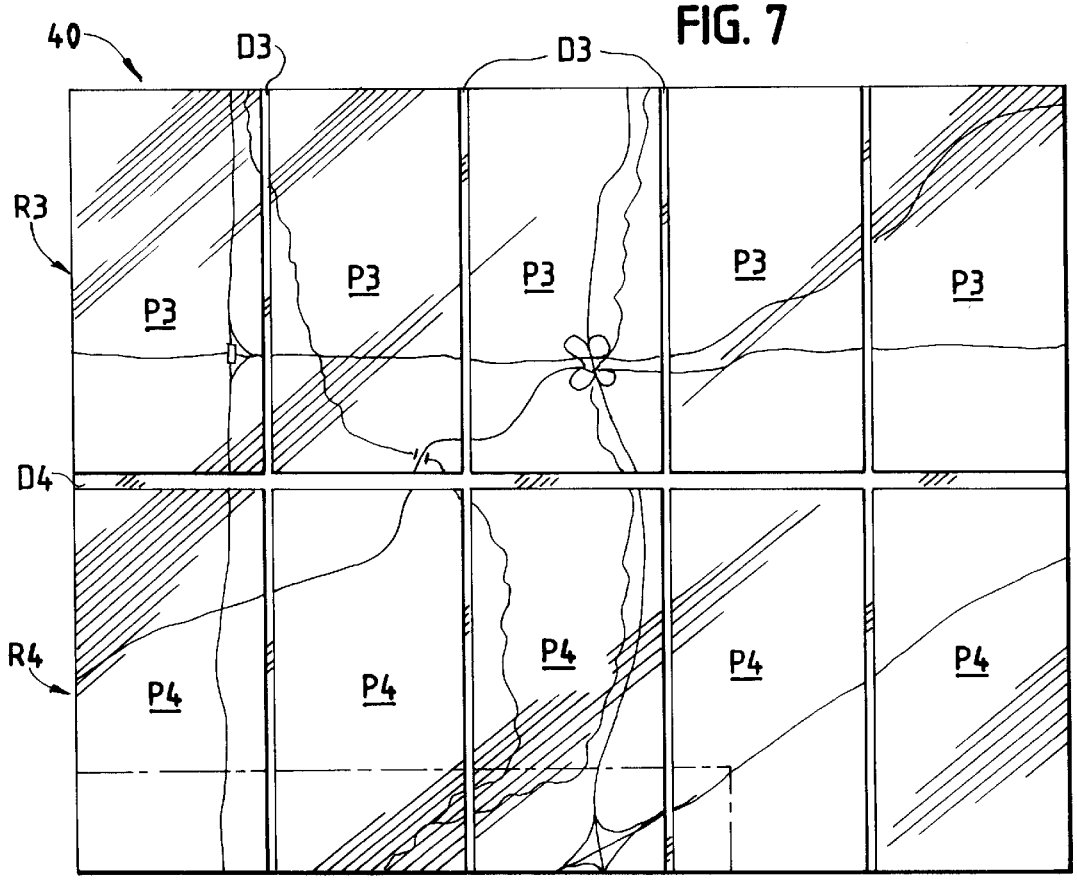

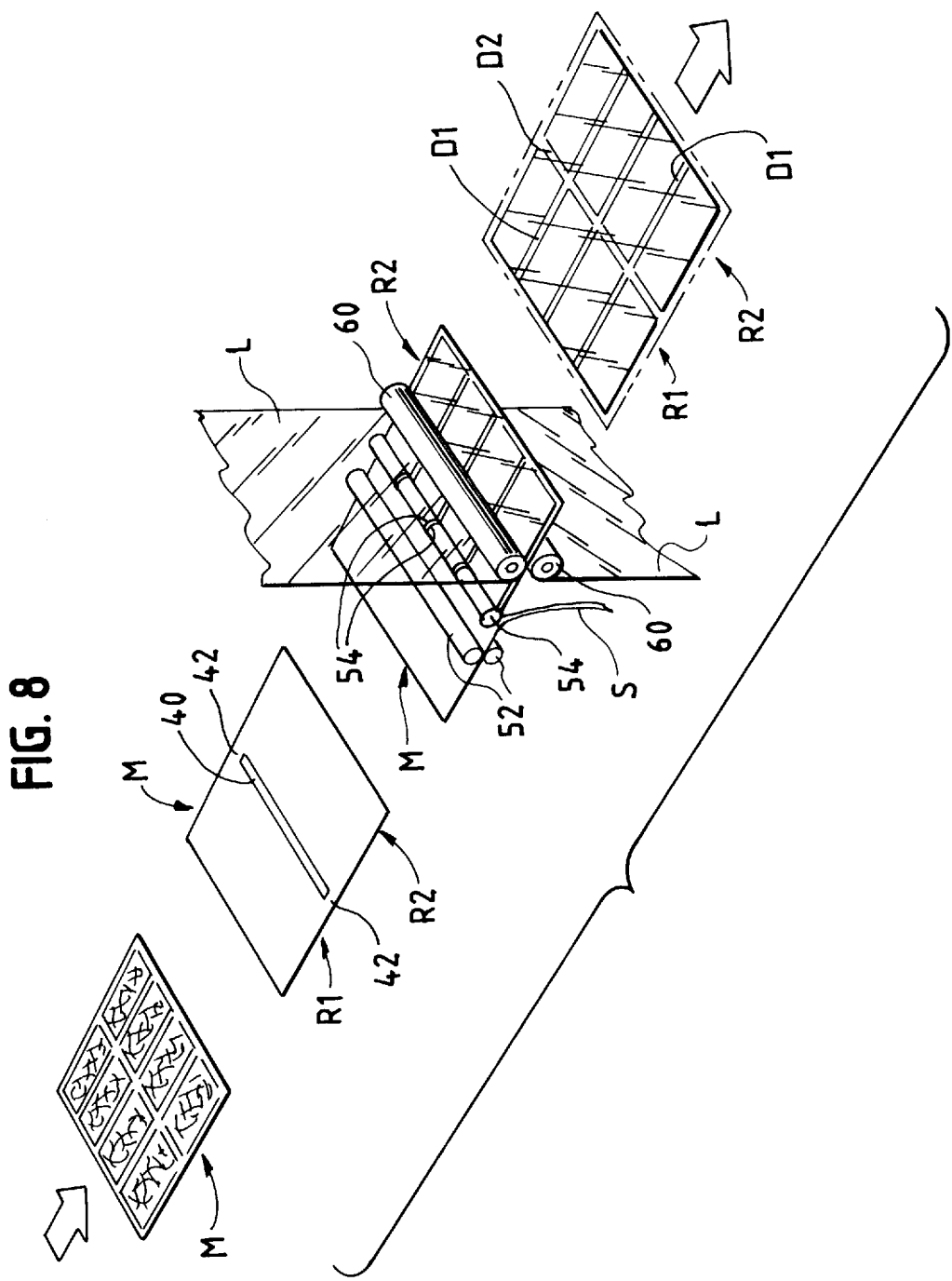

MULTIDIRECTIONAL MULTIPLE FOLD LAMINATED PRODUCT AND METHOD OF MAKING

This application is a continuation, of application Ser. No. 08/383,057 filed Feb. 3, 1995 now abandoned For many years road maps have been printed on paper which is prefolded into a package of convenient size and shape. Typically such folded packages have been rectangular. In the past several years, laminated maps have been developed which have employed a series of rectangular panels joined together in a side-by-side array, but which are foldable into a rectangular package. Such maps have typically folded into a rectangular package which is substantially greater in size (in plan view) than most folded paper maps distributed in the United States. Further, because of the limitations of their design, available folded laminated maps open to a size which is very much smaller than the size of a typical paper map. That severely limits the size of the area to be displayed, or if not the size, then the scale of the area depicted. That means that the opportunity to display details is hampered. Furthermore, available multi-panel laminated maps, by their construction, are long and narrow.

It would be desirable to provide a laminated map which, when folded, is more compact than currently available laminated maps, but which, when opened, provides a substantially greater surface area, thereby to provide room for greater detail and coverage in both the north-south and east-west directions. It would also be desirable to provide a laminated map that has a greater size in the vertical dimension than is practically possible with existing laminated maps, while still permitting folding of the map into a more compact package. It also would be desirable to employ these characteristics in other products, such as gameboards, informational products, educational tools, etc.

It would also be desirable to provide an improved method for making such products and maps.

SUMMARY OF THE INVENTION

In accordance with the present invention, an improved laminated multidirectional, multiple fold product and method of making same is provided. The laminated product has a plurality of adjacent rectangular panels, each displaying selected intelligence. Each panel comprises a paperboard sheet having a pair of display surfaces and a pair of transparent sheets covering the paperboard sheet display surfaces and joining all of the paperboard sheets of the product into an integrated laminated product. The panels are arranged in at least two rows of plural panels and a plurality of columns of panels, one from each row, each pair of panels in a row being spaced apart by a distance which is minimally equal to at least the total thicknesses of the panels in the row and each pair of panels in a column being spaced apart by a substantially greater distance which is minimally equal to at least the thicknesses of the total number of panels comprising the product. As a result, when the pairs of panels in the columns are accordion-folded in the direction of the columns, and are then folded to cause the panels of one row to overlie the panels of the other row, the product will so fold into a compact stack without substantial resistance to movement into that configuration and will be substantially flat; further, when the panels are temporarily folded multidirectionally into single stack compact random arrays, those arrays will be compact and substantially flat, and any surface of any panel may therefore be temporarily easily displayed for viewing.

In one form of the invention the product is a laminated map. The product preferably has two rows, and each row has at least four rectangular panels. The panels are desirably about 4¼ inches by about 9 inches in size. The paperboard sheet of each panel may be entirely separate from each other paperboard sheet. In a preferred form the distances between panels is at least about 10 percent greater than the minimal distances.

An improved method of making a multidirectional, multiple fold, multi-row, multi-column laminated product in accordance with this invention comprises the steps of providing a rectangular paperboard sheet with intelligence printed on at least one side thereof, the sheet having a leading edge, two perpendicular side edges and a trailing edge parallel to the leading edge, feeding the leading edge of the sheet in a first direction and cutting out a narrow transverse segment in the middle of the sheet to produce a narrow transverse gap, leaving connecting portions at each end of the transverse gap, the transverse gap being parallel to the leading edge, gripping the paperboard sheet and feeding its leading edge in the same first direction and continuously cutting the paperboard sheet into adjacent panels in a direction parallel to the side edges and perpendicular to the leading edge with cutters, thereby to remove strips of waste from between adjacent panels, and feeding the leading edge into a laminating roller nip with laminating sheets prior to cutting with the cutters into the zone of the transverse gap and continuously gripping the sheet between its side edges at a distance from the laminating roller nip that is less than the distance between the leading edge and the transverse gap.

In a preferred form, the method additionally comprises cutting selvage from the sides of the paperboard sheet to remove selvage and the connecting portions, concurrently with the cutting of strips of waste from between adjacent panels. Laminating desirably continues until the trailing edge passes through the laminating nip, following which the leading edge, the trailing edge and the side edges are trimmed to provide finished edges.

Further objects, features and advantages of the present invention will become apparent from the following drawings and description.

BRIEF DESCRIPTION OF THE DRAWINGS

FIG. 1 is a perspective view of an open, typical multidirectional, multiple fold product of the present invention, the product having two rows of four rectangular panels each;

FIG. 2 is an open, plan view of the product of FIG. 1;

FIG. 3 is a side elevational view of the product of FIG. 2;

FIG. 4 is a top elevational view of the product of FIG. 2;

FIG. 5 is a fragmentary cross-sectional view taken along line 5—5 of FIG. 2;

FIG. 6 is a view of the product of FIG. 1 folded into a compact form;

FIG. 7 is an open, plan view of a further embodiment of a product of the present invention;

FIG. 8 is a schematic perspective view of a printed paperboard sheet bearing intelligence in the form of a map, illustrating stepwise the process of forming a compactly foldable map product of the present invention;

DETAILED DESCRIPTION

Figures 9, 10:
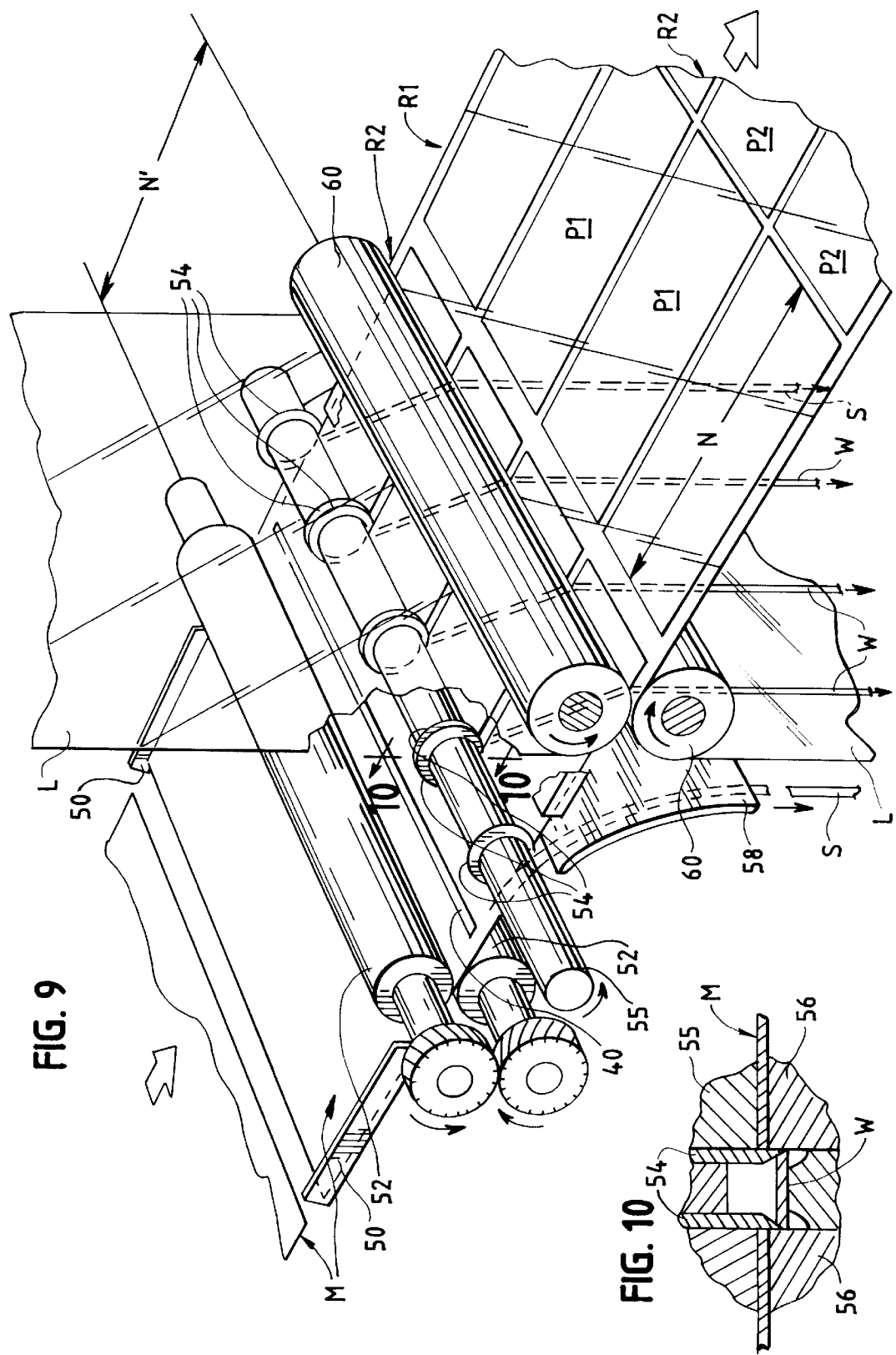
FIG. 9 is a fragmentary enlarged detailed view of a portion of FIG. 8.
FIG. 10 is a sectional view of the cutters and associated components of FIG. 9.

Integrated, laminated multidirectional, multiple foldable products 10 in accordance with the present invention have multiple, spaced apart rectangular panels P1, P2 which are arrayed in both horizontal rows and vertical columns. Each panel is made up of a central, relatively stiff, paperboard sheet 12 having upper and lower display surfaces and waterproof, transparent upper and lower outer laminating sheets 14, 16 joining all of the sheets 12 into an integrated product. The upper and lower outer sheets are each integral sheets which extend across the paperboard sheets 12 and across the spaces between them. The panels display selected intelligence which, in a map product, is ideally complete and continuous between adjacent panels. Of course the panels may display other selected intelligence, words, graphics, and the like, and may display inserts as well. Typically in a map at least some of the adjacent panels display continuous cartography.

The panels of the product 10 are spaced from adjacent panels by predetermined distances which are greater between the rows than between adjacent panels in the same row. Thus, the array of multiple panels may be folded multidirectionally into a relatively flat stacked condition, while providing a laminated map or like product which is not only compact, but which is capable of providing a display area which is substantially greater than a comparable single row product can display. A typical display area is about 17 by 18 inches, with eight panels folding to a compact size of about 4¼ inches by 9 inches, a size which conveniently fits into existing merchandizing racks, glove compartments, purses and pockets.

Importantly, for temporary use the map may be compactly folded multidirectionally into a stacked array in a variety of configurations to compactly display either side of any panel, and the spaces between the panels is selected and dimensioned so that the map may be so folded. Thus, the map may be temporarily folded in a variety of random arrays, with all of the panels in a single stack arranged to form a very compact package, thereby to easily temporarily display any desired panel surface for viewing.

As shown by the drawings, panels P1 in a first horizontal row R1 are disposed adjacent panels P2 in a second horizontal row R2. Each pair of adjacent panels P1, P2 defines a vertical column, of which four such columns (C1, C2, C3 and C4) are illustrated in FIGS. 1 and 2. As will be appreciated, the distances D1 between adjacent panels P1 in the first horizontal row R1 (and between adjacent panels P2 in the second horizontal row R2) are of a first dimension, while the distance D2 between the first and second rows R1, R2 is of a second dimension greater than distance D1.

Preferably distance D1 is minimally equal to at least total the thicknesses of the panels in a row, namely four times the thicknesses of the transparent sheets 14, 16 and paperboard sheet 12 making up each panel P1 and P2 of the product 10, whereas distance D2 is substantially greater, namely is minimally equal to at least the sum of the thicknesses of all of the panels P1 and P2 of the product 10. Thus, when the pairs of vertically adjacent panels P1, P2 in a column are folded accordion-style relative to each other, and the thusly folded array is folded in half, the resulting stacked array is compact for storage and will lie substantially flat, all without substantial resistance to movement into that folded configuration. Further, when the panels of a row are folded in on each other, the resulting stacked array will still lie substantially flat.

Although their dimensions may vary, in a preferred form the paperboard sheets are about 0.008 inch in thickness and the outer laminating sheets are polyester and are of a thickness of 0.003 inch. The thicknesses of the paperboard sheets are about 2⅔ times the thicknesses of each plastic sheet. Of course other laminating sheets may be used, such as polypropylene film sheets. In this embodiment the distance D1 is minimally about 0.056 inch, and the distance D2, where eight panels are present, is minimally about 0.112 inch. In a most preferred form the distances D1 and D2 are at least about 10% more than the specified minimum. This provides for effective folding while allowing for idiosyncratic variations from product to product, all while keeping the space between the adjacent edges of panels and the contiguous intelligence to a reasonable minimum.

The panels and laminating sheets are joined via a lamination process, and the resulting laminate may be trimmed around the border or perimeter to provide sharp, clean finished edges. The edges may be sealed edges, trimmed edges as illustrated by FIG. 5, or a combination of such edges.

In a most preferred form, the intelligence on the panels may be printed thereon, and may take the form of a map, as illustrated by FIGS. 1 and 2. Desirably the intelligence is printed on the paperboard itself, which, as is clear from the foregoing, is then protected from the ambient surroundings by the transparent, waterproof laminating sheets. Preferably, the paperboard sheets 12 are each separate elements as they are laminated with the plastic sheets 14, 16, as a result of which they are not joined together. Therefore there is no resistance to folding or bending resulting from connecting tabs or the like, as is the case with laminated articles illustrated in FIGS. 1 and 2 of Howard U.S. Pat. No. 5,063,637.

As shown by the drawings, the spaces between adjacent pairs of panels are overlaid by portions of the transparent laminating sheets 14, 16. These portions of the sheets serve as hinges and, depending upon the laminating process and the means used to laminate the paperboard and plastic sheets, may be joined or bonded to each other in the spaces D1, D2 between the paperboard elements of the panels or may be independent of, and spaced from, each other.

Referring now to FIG. 7, a further product 40 of the present invention is illustrated. It comprises a series of panels P3 and P4 defining a pair of spaced horizontal rows R3, R4 and a plurality of vertical columns, each containing a panel P3 and P4, like the columns of panels of the embodiment of FIG. 1. In this case there are five pairs of columns (rather than four). The columns are similarly adapted to be accordion-folded, and then from that array to be folded over into a compact single layer of panels, just like the product of FIGS. 1–6. In this instance the distances D3 between panels in the same row, and the distance D4 between panels in the same column are determined as described above regarding the embodiment of FIGS. 1–5, namely are 5 and 10 times the panel thickness, respectively.

The products illustrated and described have been described in terms of maps. It will be apparent that other products may be similarly constructed to provide advantages as described herein, such as, for example, gameboards on which suitable graphics are provided. It will also be clear that rectangular panels of a variety of proportions may be used, ranging from panels which are square in shape to those which are considerably larger in one dimension than in the other, as is shown by the drawings.

Maps and other like products of this invention provide a number of substantial advantages over prior art laminated products. They provide substantially more map coverage in a smaller package than prior art laminated maps. They are 60% larger than conventional folding laminated maps when opened, providing room for other features and permitting larger scale displays. Thus, a typical eight-panel map which folds into a 4¼"×9" stack may provide a full open display which is approximately 17"×18". This is a comfortable size to work with, while permitting folding to a standard United States map size which means it is easy to store in cars, purses, pockets or briefcases. Foldable maps in accordance with this invention are tear, spill, weather and water-resistant and are long-lived. They may be temporarily marked with a marker and erased.

Maps and other laminated products in accordance with this invention may be made by a laminating process which will now be described. It will be understood that the laminating sheets may be provided with an adhesive which, under heat and/or pressure, will permanently bond the laminating sheets to the paperboard during the laminating process.

In accordance with an exemplary process of the present invention when used to make a map, paperboard is printed on each side with suitable intelligence including cartographic intelligence and other selected display materials such as area identification, street listings, etc. The printed paperboard may also provide "selvage" areas around the border (See FIG. 8) as well as zones in which spaces D1 will be provided, which zones are printed with narrow zones of duplicate intelligence so that if the spaces cut vary laterally, within limits all of the desired intelligence will be displayed. This is as shown in FIGS. 11A and 11B and will be explained later.

As shown by FIG. 8 a printed master paperboard sheet M having a forward leading edge, a parallel trailing edge and opposite perpendicular side edges, is first cut, such as by die-cutting, to remove a narrow transverse paperboard segment from the middle of sheet M along a zone corresponding to space D2. Connecting segments 42 at the ends of the resulting gap 40 are left to temporarily hold rows R1 and R2 together. The master paperboard sheet M is then advanced, as along a table and between lateral guides 50 (FIG. 9), to a pair of drive rollers 52 having surfaces which firmly grip the leading edge of the master sheet M to feed and drive the master sheet forwardly in a first direction. The surfaces may be rubber, nylon or other suitable materials. A series of cutters 54, such as rotary blade cutters mounted on roller 55, are provided. Pairs of cutters 54 continuously cut and slit strips of waste paperboard W between adjacent panels P1 and single cutters 54 remove a border of selvage S at each side edge of sheet M. As shown in FIG. 10, the cutters 54 may cooperate with suitable anvils 56 to sever the strips from the paperboard sheet M. The strips W and selvage S are engaged, as by a diverter 58, which forces and drives the strips and selvage downwardly to waste. The strips W removed by cutters 54 between adjacent panels correspond to the spaces D1 illustrated in FIG. 2.

Although efforts are made to precisely cut the paperboard along spaced edges E of intelligence produced by the printing of the paperboard, that does not always successfully occur. To compensate for that, the zones to be removed are printed to accommodate to that circumstance as will now be described.

Figure 11A:
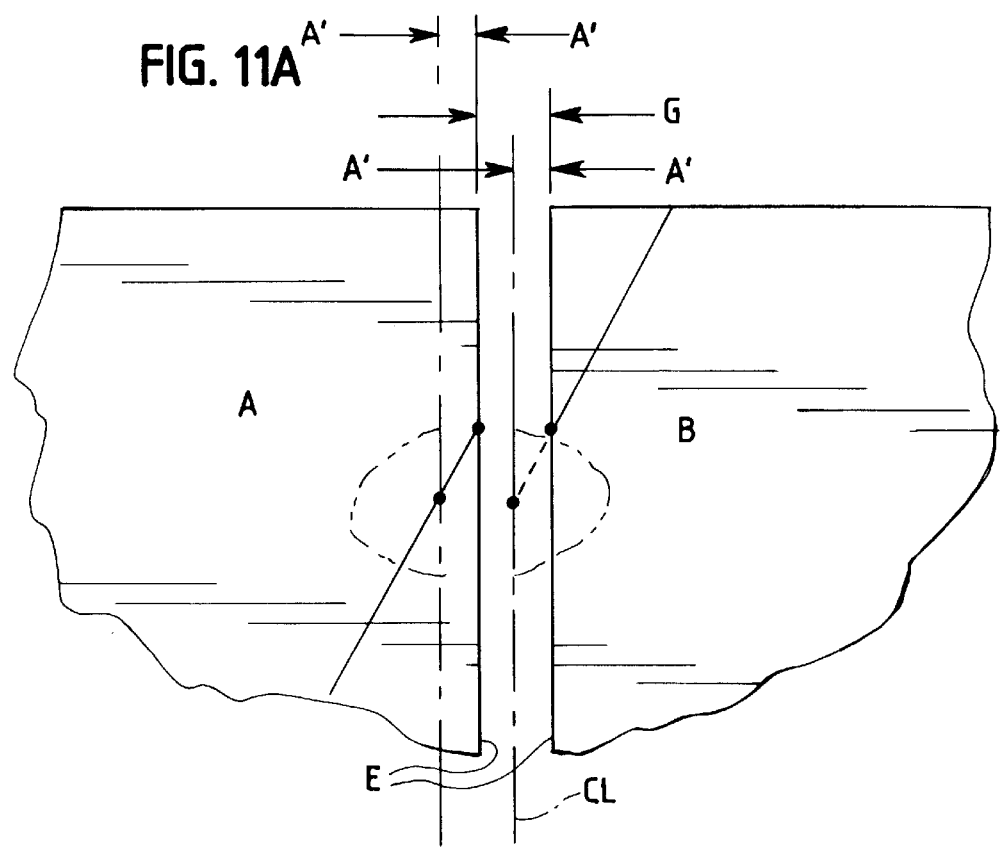
FIGS. 11 and 11B illustrate portions of the master paperboard sheet of FIG. 8.
Figure 11B:
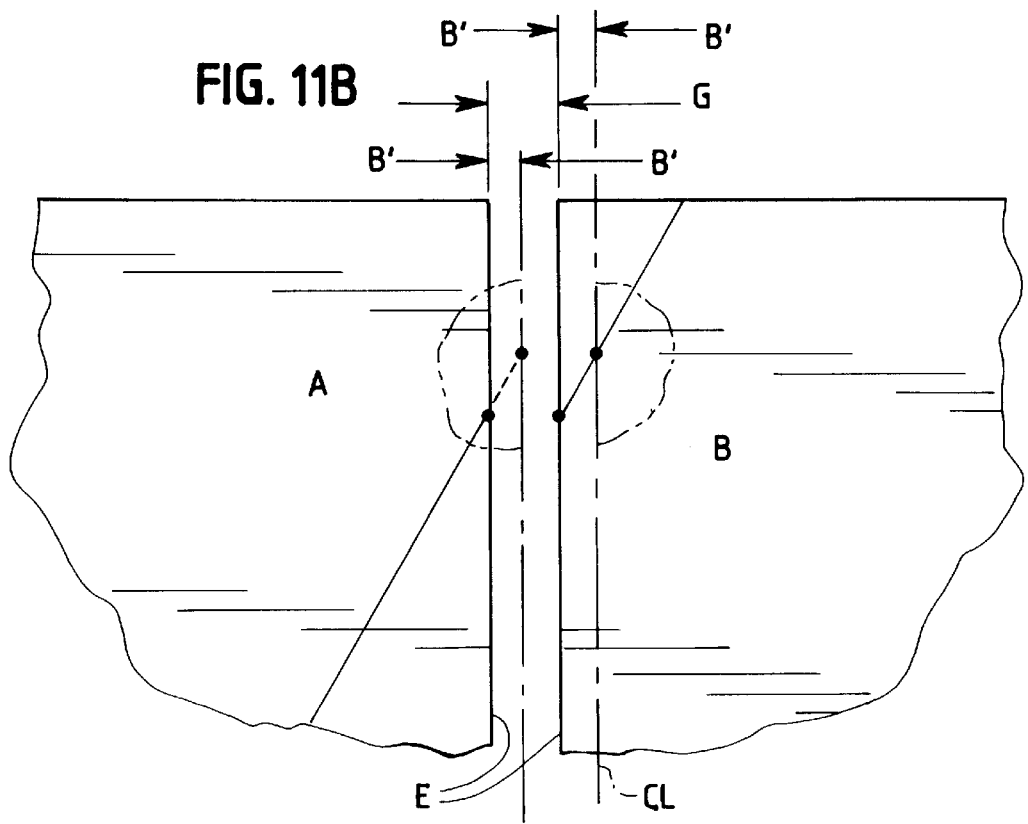

Referring to FIGS. 11A and 11B, representative adjacent panels A and B to be formed from a master sheet M are shown. Panels A and B may be considered as a pair of panels P1. These panels A, B are spaced apart by a distance G and if cut exactly along their confronting edges E to provide a space D1 will show complete contiguous adjacent subject matter. The pairs of cutters 54 are spaced to cut out a strip of waste W exactly equal to distance G. However, because of slight misalignments, frequently the paperboard sheet is offset laterally so that the cutters 54 will cut out a strip W equal to distance G but either to the right or left of the confronting edges E, which as shown in Figs. 11A and 11B, are equidistant from the centerline CL between edges E. To compensate for that misalignment possibility, a duplicate of segment A'A' of the map portion on panel A is printed adjacent to edge E of panel B as illustrated in FIG. 11A and a duplicate segment B'B' of the map portion on panel B is printed adjacent to the edge E of panel A, as illustrated in FIG. 11B. Thus, if the cutters 54 remove a strip W which is not centered on the centerline CL, namely is offset somewhat, as long as the cut is not offset by more than one-half of the width of the strip W to be removed, a complete representation of the map intelligence will remain at space D1.

The drive rollers 52 continue to drive the master sheet M toward and into the nip of the laminating rollers 60 at which laminating sheets L are presented to the upper and lower surfaces of the developing panels of the master sheet M. The laminating rollers 60 then take control of the sheet M and draw it and the laminating sheets L therethrough.

The drive rollers 52 continue to drive the master sheet M forwardly as well, and in a manner which does not interfere with the operation at the laminating rollers 60. Rollers 52 continue to control the relative positioning of the panels P2 to each other as the cutters 54 continue to slit and cut the master sheet M. At the time the cutters 54 reach the space D2 and sever segments 42, the temporary connection between the adjacent rows R2, R1, the portion of the sheet M trailing the die-cut space D2 will be under the control of rollers 52 and the forward ends of the panels of the row R2 will be under the control of the rollers 60. To maintain such control, it will be appreciated that the length N' is less than length N (See FIG. 9). In that manner the relationship of the drive rollers 52 and laminating rollers 60 to the panels of the master paperboard sheet will be maintained. Because rollers 52 are driven in synchronization with the laminating rollers 60, the developing master sheet panel elements P1 remain spaced as desired from the paperboard elements of panels P2 and the columns of pairs of panels P1, P2 remain properly aligned. The paperboard of row R1 remains under the control of the rollers 52 until after the panels P1 are fed into the nip provided by rollers 60. Thus, the array of paperboard panels is located precisely as desired, and the relationships of the intelligence on the panels and the paperboard elements of the panels in the laminated product are accurately and suitably located and maintained.

The laminating films L are typically wider than the width of the panels of rows R2 and R1. As such, after the laminate is formed (after the trailing edge passes through the laminating nip), the edges may be trimmed by cutters (not shown) as schematically illustrated by FIG. 8 to provide finished edges, such as a sealed border, or the laminate may be trimmed to provide a butt edge of paperboard and laminating film (as illustrated by FIG. 5) at the side edges. The leading and trailing edges may be similarly trimmed to provide a butt-cut border as illustrated by FIG. 5, or they may be trimmed to provide sealed, waterproof borders.

From the foregoing, it will be apparent that numerous modifications and variations can be effected without departing from the spirit and scope of the present invention. It will be appreciated that the present disclosure is intended as an exemplification of the invention, and is not intended to limit the invention to the specific embodiments illustrated and described. The disclosure is intended to cover by the appended claims all such modifications as fall within the scope of the claims.

What is claimed is:

1. A laminated product having a plurality of adjacent rectangular panels each displaying imprinted intelligence, each said panel comprising an individual rectangular paperboard sheet, each said paperboard sheet having a pair of opposite display surfaces and having outer perimetric edges, said paperboard sheets together defining a rectangular array, and outer perimetric edges of said sheets together defining an outer boundary for said rectangular array of paperboard sheets, said laminated product further comprising a first transparent sheet covering a first surface of said array of paperboard sheets and a second transparent sheet covering the second surface of said array of paperboard sheets, said transparent sheets joining all of the paperboard sheets into said integrated laminated product, said transparent sheets being continuous between the outer boundary of said rectangular array, being coextensive with all of said paperboard sheets, and being characterized by the absence of slots between said paperboard sheets, said panels being arranged in at least two rows of plural panels and a plurality of columns of panels, each column including one panel from each row, each pair of paperboard sheets in a row being spaced apart from each other by a distance which is at least equal to twice the thickness of a panel, and each pair of paperboard sheets in a column being spaced apart by a substantially greater distance than at least twice the thickness of a panel, said substantially greater distance being at least equal to the thicknesses of the total number of panels comprising the laminated product, whereby when the pairs of panels in the columns are accordion-folded in the direction of the columns, and are then folded to cause the panels of one row to overlie the panels of the other row, the product will so fold into a compact stack without substantial resistance to movement into that configuration and will be substantially flat, and when the panels are temporarily folded into other single stack compact random arrays, such arrays will be compact and substantially flat, all so that any display surface of any panel may be temporarily easily displayed for viewing, and whereby all folding occurs between the paperboard sheets and depends entirely upon the folding of said transparent sheets and ripping and tearing of said transparent sheets is avoided because of the absence of slots in said transparent sheets between said paperboard sheets.

2. The laminated product of claim 1, and wherein said product is a map.

3. The laminated product of claim 1, and wherein said product has two rows, and each row has at least four rectangular panels.

4. The laminated product of claim 1, and wherein the paperboard sheet of each panel is entirely separate from each other paperboard sheet of every other panel.

5. The laminated product of claim 1, and wherein the distances between the pairs of paperboard sheets in a row and the pairs of paperboard sheets in a column are between 10 to 30 percent greater, respectively, than two times the thickness of a panel and the thicknesses of the total number of panels.

6. The laminated product of claim 5, and wherein said product is a map.

7. The laminated product of claim 5, wherein said map has two rows, and each row has at least four rectangular panels, each paperboard sheet being entirely separate from each other paperboard sheet.

8. The laminated product of claim 7, and wherein said map panels are about 4¼ inches by about 9 inches in size.

* * * * *